UNITED STATES PATENT OFFICE.

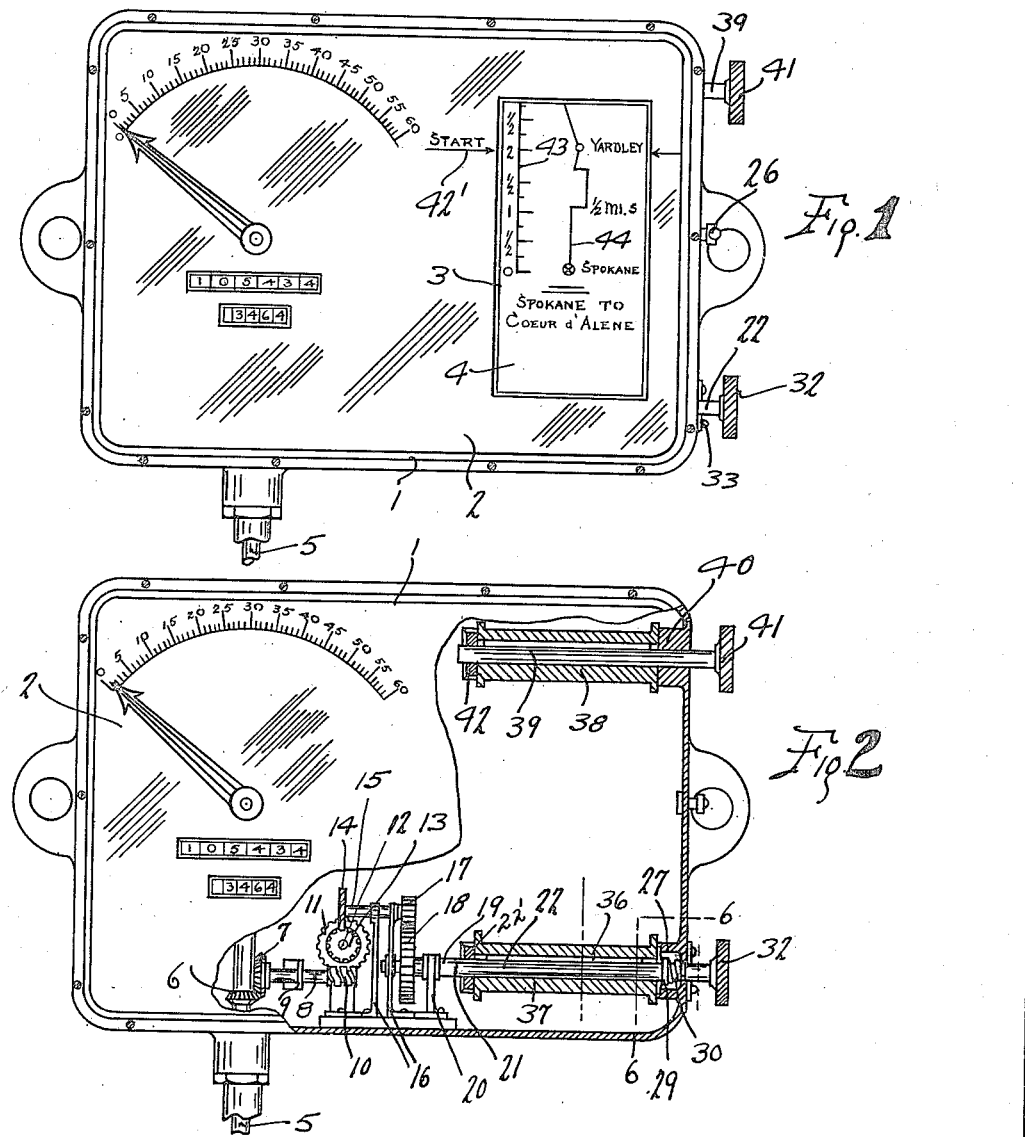

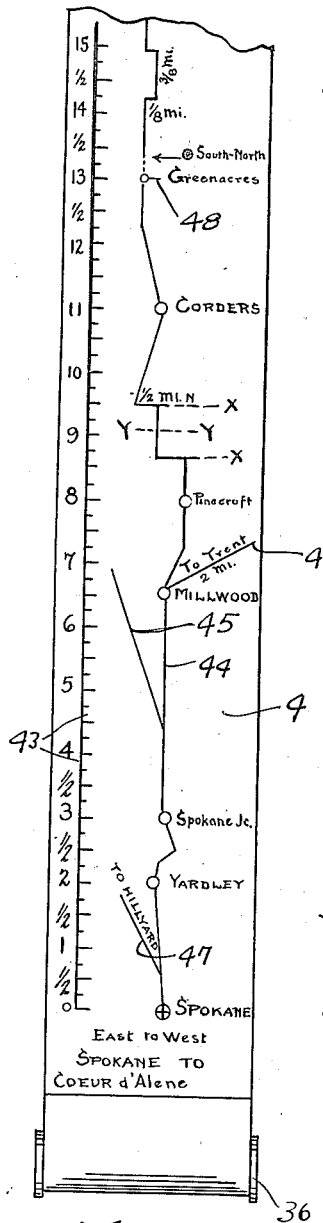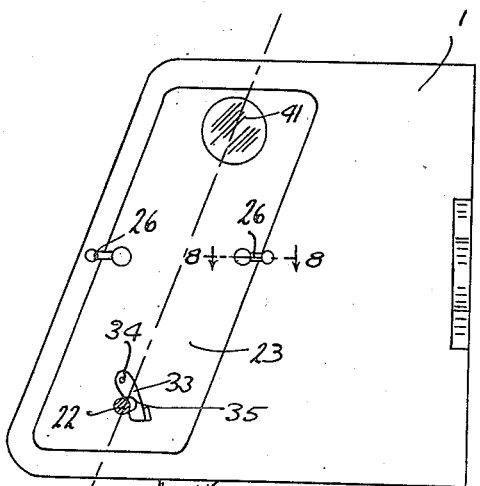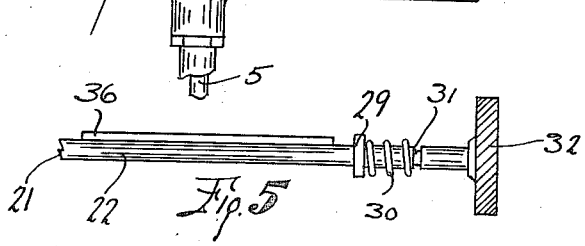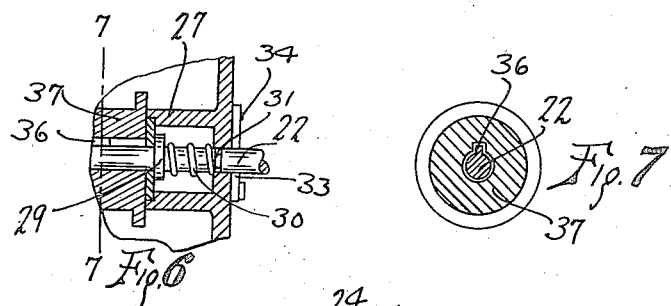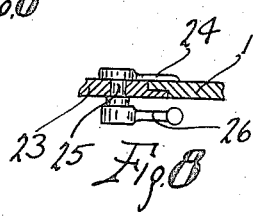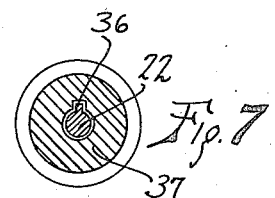

RICHARD HENRY JOHNSON, OF CRESTON, WASHINGTON.

ROUTE-INDICATOR.

1,124,745.
Specification of Letters Patent.
Patented Jan. 12, 1915.

Application filed October 30, 1913. Serial No. 798,281.

*To all whom it may concern:*

Be it known that I, RICHARD HENRY JOHNSON, a citizen of the United States, residing at Creston, in the county of Lincoln and State of Washington, have invented a new and useful Improvement in Route-Indicators, of which the following is a specification.

This invention relates to improvements in route indicators for use on vehicles, such as automobiles, to indicate mileage and variations of road direction to the driver.

One of the objects of the invention is to associate or combine a route indicator with a speedometer in such a manner as to drive both from the running gear by one shaft connection.

A further object is to provide a web having regularly spaced mileage graduations and a line of route so distorted in proportion with respect to the road traveled as to bring certain points or cities in accurate registering proximity to the mileage graduations as to indicate mileage and location of such points irrespective of any turns or departures of the road from a straight line.

A further object is to provide means whereby the route indicator may be thrown out of gear when it is desired to make special short runs in and about cities along the line of route without any adherence to movement toward the final point of destination.

Other features and objects of the invention will be more fully described in connection with the accompanying drawings and will be more particularly pointed out in and by the appended claims.

In the drawings:—Figure 1 is a face view of a combined speedometer and route indicator embodying one form of my invention. Fig. 2 is a view similar to Fig. 1 with parts broken away and parts in section, for clearness of illustration. Fig. 3 is an end view of the device shown in Fig. 2. Fig. 4 is a view in elevation of a portion of the web. Fig. 5 is a detached view of one of the spindles for one of the web spools. Fig. 6 is a fragmentary sectional view indicated by line 6—6 of Fig. 2. Fig. 7 is a sectional view on line 7—7 of Fig. 6. Fig. 8 is a sectional view on line 8—8 of Fig. 3.

Like characters of reference designate similar parts throughout the different figures of the drawings.

When the device of my invention is combined with a speedometer it may be embodied in a casing 1, having a front face 2 provided with an opening 3 through which the indicator web 4, may be viewed. One shaft may be employed to operate both the indicator and the speedometer and such shaft is indicated at 5 and may be connected for operation from the running wheels in any desirable manner, not shown. A bevel gear 6, on the shaft 5, meshes with a bevel gear 7 to transmit rotary motion to a worm shaft 8. Said worm shaft 8 is journaled in a bearing 9 and carries gear 7 on one end and a worm 10 on the other end. Worm 10 forms one unit of a reducing gear train which includes a worm wheel 11 with which the worm 10 meshes and which is mounted upon a shaft 12. A worm wheel 13, mounted on shaft 12, meshes with a worm disk 14 on shaft 15. Shaft 15 is journaled in bearings 16 and carries a small pinion 17 meshing with gear wheel 18. Gear wheel 18 is mounted on a spindle driving shaft 19 which is longitudinally immovably but rotatively journaled in one of the bearings 16 and a bearing 20. The end of spindle drive shaft 19 is toothed to clutch with the toothed end 21 of a primary or driving spool spindle 22. A plate 23 set flush with one end of the casing incloses an opening therein which serves for access to the interior of the casing. Suitable fastening devices are provided for holding the plate in a closed position, and as shown in Fig. 8 said devices comprise interior fingers 24 mounted on spindles 25 rotatable in the plate 23 and having externally disposed finger levers 26 mounted thereon.

The lower spindle 22 is journaled in the plate 23 and the latter is provided with a hub 27 having a shouldered margin in which a spindle bearing disk is seated and the spindle 22 is provided with an annular flange 29 for engagement with said disk. A spring 30 is interposed between said disk 29 and the plate 23 to normally hold the spindle 22 in the position shown in Fig. 6. The spindle 22 is provided with an annular groove 31 which is so located as to lie within the outside face of the plate 23 when the spindle 22 is in the position shown. A knurled thumb nut 32 is mounted on the end of spindle 22 for either rotative or longitudinal adjustment thereof. A retainer 33 is pivoted at 34 on the outer face of plate 23 and is provided with a notch 35 for engagement with the groove 31 when the latter and the spindle 22 are shifted longitudinally to bring the groove 31 in registry with the retainer 33. Such longitudinal shifting movement will serve to disconnect the spindle 22 from driven connection with the spindle driving shaft 19 so as to throw the indicator out of gear. In the adjustment shown in Fig. 2 however, the spring 30 holds the spindle 22 in driven connection with the shaft 19. The spindle 22 is provided with a key 36 for non-rotative engagement with the primary spool 37 onto which the web 4 is wound from a secondary spool 38. The secondary spool 38 is keyed to a secondary spindle 39 which is journaled in a hub bearing 40 formed on the plate 23. The spindle 39 is provided with a knurled thumb disk 41 and the spool 38 is held on the spindle 39 by any suitable bearing means indicated at 42, fixed to the casing. A similar bearing means 22′, fixed to the casing, supports spindle 22 at a point at one side of its clutch engagement with driving shaft 19.

It will be understood that each map will be attached to two spools and the different maps will be provided for the different routes which it is desired to traverse. By removing the plate 23 the spools can be removed from the spindles and another map with its spools inserted.

A starting index is indicated at 42′ and the web 4 is drawn downwardly in the form shown, abreast of said index. In making up the map, on the web 4, the graduations 43 will be regularly spaced apart and the map will be driven at a proportionate speed by the gearing herein before described so that as the map traverses a distance equal to the distance between two numbered graduations, the vehicle will have covered a road mile. Any roads leading from the main line 44 will be designated by canting lines 45, 46 and 47. In order to compensate for lateral turns of the main road the map at such designating points will be distorted, as by contraction, so that the lineal distance between two city designating points can be located adjacent the proper designation of actual mileage. Thus in making up the map, the cities will be located the exact distance equal to the length of road to be traveled in going from one to the other, including all turns of the road and left and right swings, the map being distorted from true proportion as little as possible to develop the correct ratio with the mileage indications. Above the town of Greenacres, as indicated at 48, the main line is dotted to indicate a swing north and south, or in other words, a deflection from the east and west main line. At a point above Pine Croft, the road deflects from the main line and the distance from X to Y would necessarily show longer on the map because the map would necessarily continue to move downwardly, while the road deflected, so that while the point where the section line Y—Y crosses the road, would be the actual distance traveled, still it would be necessary to continue the map line upwardly a distance equal to the amount of travel subtracted from a true east to west advancing movement.

While I have herein shown and described one specific form of my invention I do not wish to be limited thereto except for such limitations as the claims may import.

I claim:

1. In a route indicator, a casing, a removable plate for said casing, a driving shaft in said casing, web spools and spindles therefor, said spindles being journaled in said plate, a web trained about said spools, and means for locking said plate on said casing to drivingly connect one of said spindles with said shaft, substantially as described.

2. In a route indicator, a casing, a removable wall portion for said casing, a driving shaft in said casing having terminal end clutch teeth, spindles journaled in said wall portion and one of said spindles having terminal end clutch teeth, spools mounted on said spindles, a web trained about said spools, and means for locking said wall portion on said casing to effect endwise clutch connection between the teeth of said driving shaft and the teeth of said clutch spindle, substantially as described.

3. In a route indicator, a casing, a removable wall portion for said casing, a driving shaft in said casing having clutch teeth, spindles journaled in said wall portion and one of said spindles being a clutch spindle and having clutch teeth, bearing devices in said casing for the free ends of said spindles, spools mounted on said spindles, a web trained about said spools, and means for locking said wall portion on said casing to effect clutch connection between said driving shaft and said clutch spindle, substantially as described.

4. In an indicator device of the class described, a casing, a removable wall portion for said casing, a driving shaft in said casing, a spindle revolubly and longitudinally slidably mounted in said wall portion, a spring for maintaining said spindle in driven connection with said driving shaft when said wall portion is in position on said casing, and means for locking said spindle out of driven relation with said shaft, substantially as described.

5. In an indicator device of the class described, a casing, a removable wall portion for said casing, a spindle driving means in said casing, spindles journaled in said wall portion, spools on said spindles, a web trained about said spools, means for locking said wall portion on said casing to drivingly connect at least one of said spindles with said driving means, and bearing devices in said casing for journal engagement with said spindles to hold the spools thereof against longitudinal movement in one direction when said wall portion is locked upon said casing, substantially as described.

6. In an indicator device of the class described, a casing, a removable wall portion for said casing, a driving shaft in said casing, a spindle revolubly and longitudinally slidably mounted in said wall portion, a spring for maintaining said spindle in driven connection with said driving shaft when said wall portion is in position on said casing, and means mounted on said wall portion for locking said spindle out of driven relation with said shaft while said wall portion is in place on said casing, substantially as described.

7. In an indicator device of the class described, a casing, web driving means in said casing, a removable wall portion for said casing, web mechanism journaled in said wall portion, and means for locking said wall portion in place on said casing to drivingly connect said web mechanism with said driving means, substantially as described.

In testimony whereof I hereby affix my signature in the presence of two subscribing witnesses.

RICHARD HENRY JOHNSON.

Witnesses:
C. E. FUNKHOUSER,
BERT HUDKINS.